United States Patent
Liu

(10) Patent No.: US 9,471,189 B2
(45) Date of Patent: Oct. 18, 2016

(54) SENSING ELECTRODE STRUCTURE

(71) Applicant: MStar Semiconductor, Inc., Hsinchu Hsien (TW)

(72) Inventor: Tzu-Wei Liu, Zhubei (TW)

(73) Assignee: MStar Semiconductor, Inc., Hsinchu Hsien (TW)

( * ) Notice: Subject to any disclaimer, the term of this patent is extended or adjusted under 35 U.S.C. 154(b) by 13 days.

(21) Appl. No.: 14/549,671

(22) Filed: Nov. 21, 2014

(65) Prior Publication Data

US 2015/0145823 A1     May 28, 2015

(30) Foreign Application Priority Data

Nov. 22, 2013  (TW) .............................. 102142674 A

(51) Int. Cl.
    *G06F 3/044* (2006.01)

(52) U.S. Cl.
    CPC ..... *G06F 3/044* (2013.01); *G06F 2203/04107* (2013.01)

(58) Field of Classification Search
    CPC ................. G06F 3/044; G06F 2203/04103; G06F 2203/04107; G06F 2203/04111
    USPC ........................................................ 345/174
    See application file for complete search history.

(56) References Cited

U.S. PATENT DOCUMENTS

| | | | | |
|---|---|---|---|---|
| 6,297,811 B1* | 10/2001 | Kent | ........... | G06F 3/044 178/18.01 |
| 2010/0295814 A1* | 11/2010 | Kent | ........... | G06F 3/044 345/174 |
| 2011/0007030 A1* | 1/2011 | Mo | ........... | G06F 3/044 345/174 |
| 2011/0157084 A1* | 6/2011 | Huang | ........... | G06F 3/044 345/174 |
| 2012/0075249 A1* | 3/2012 | Hoch | ........... | G06F 3/044 345/174 |
| 2012/0182230 A1* | 7/2012 | Wang | ........... | G06F 3/044 345/173 |
| 2012/0186966 A1* | 7/2012 | Chang | ........... | G06F 3/044 200/600 |
| 2013/0257785 A1* | 10/2013 | Brown | ........... | G06F 3/044 345/174 |
| 2013/0293507 A1* | 11/2013 | Singh | ........... | G06F 3/044 345/174 |
| 2014/0320757 A1* | 10/2014 | Hoshtanar | ........... | G06F 3/044 349/12 |
| 2015/0091842 A1* | 4/2015 | Shepelev | ........... | G06F 3/044 345/174 |
| 2015/0123930 A1* | 5/2015 | Singh | ........... | G06F 1/3262 345/174 |

FOREIGN PATENT DOCUMENTS

| | | |
|---|---|---|
| TW | M420761 | 1/2012 |
| TW | 201234241 A | 8/2012 |

OTHER PUBLICATIONS

Taiwan Office Action, Mar. 4, 2015, 8 pages.

* cited by examiner

*Primary Examiner* — Tom Sheng
(74) *Attorney, Agent, or Firm* — Edell, Shapiro & Finnan, LLC

(57) ABSTRACT

A sensing electrode structure formed on a substrate of a touch device is provided. The sensing electrode structure includes: a first sensing electrode row; a second sensing electrode row, parallel to the first sensing electrode row, including a plurality of second sensing electrode units; and a guard ring, surrounding the second sensing electrode row, including a plurality of guard electrodes arranged between each two of the second sensing electrode units.

11 Claims, 5 Drawing Sheets

SENSING ELECTRODE STRUCTURE

This application claims the benefit of Taiwan application Serial No. 102142674, filed Nov. 22, 2013, the subject matter of which is incorporated herein by reference.

BACKGROUND OF THE INVENTION

1. Field of the Invention

The invention relates in general to a sensing electrode structure, and more particularly, to a sensing electrode structure having a special design of a guard ring.

2. Description of the Related Art

Touch panels make a large scale industry. Various electronic products adopt touch panels as critical input/output devices for human-machine interfaces. The performance of touch panels depends on sensing electrodes and logic circuits connected thereto. Thus, the design and quality of the sensing electrodes dominates the performance of touch panels.

The sensing electrodes of a touch panel are generally formed on a transparent substrate. Light emitted from a display device penetrates the transparent substrate to reach a user. These sensing electrodes formed on the transparent substrate include multiple electrodes, which are connected to the logic circuits via multiple conducting wires.

With the compact trend of modern electronic products, the thickness of touch panels has become the critical factor of the thickness of touch screens. Further, multi-touch has become a fundamental function of human-machine interfaces. Thus, single layered and multi-point projected capacitive touch panels are currently one of the few touch panel forms that satisfy all of the above requirements.

With the constant increase resolution demand of display devices, the performance requirements of touch panels also become higher. To provide better performances, including the resolution, precision, sensing speed for fast-moving objects, for touch devices, more electrodes and conducting wires need to be fit into a limited touch area.

Distances between electrodes may be unequal due to routing limitations, thus incurring errors caused by non-linear factors when calculating coordinates of a touch point. Therefore, there is a need for a sensing electrode structure capable of mitigating effects of unequal distances between the electrodes, so as to provide consistent amounts of mutual capacitance between the electrodes to further reduce the non-linear factors in the coordinate calculations.

SUMMARY OF THE INVENTION

According to an embodiment of the present invention, a sensing electrode structure formed on a substrate of a touch device is provided. The sensing electrode structure includes: a first sensing electrode row; a second sensing electrode row, parallel to the first sensing electrode row, including a plurality of second sensing electrode units; and a guard ring, surrounding the second sensing electrode row, including a plurality of guard electrodes arranged between the second sensing electrode units.

A main spirit of the present invention is extending a circuit of the guard ring to between each two of the second sensing electrode units of the second sensing electrode row, so that the mutual capacitance effect of the second sensing electrode row is substantially equal to that of the first sensing electrode row inserted into conducting wires to reduce the level of non-linearity, thereby enhancing the touch sensing accuracy.

The above and other aspects of the invention will become better understood with regard to the following detailed description of the preferred but non-limiting embodiments. The following description is made with reference to the accompanying drawings.

DETAILED DESCRIPTION OF THE INVENTION

Some embodiments are described in detail below. Apart from the disclosed embodiments, the present invention is also applicable in other embodiments. The scope of the present invention is not limited by the description of the non-limiting embodiments, but is to be defined in accordance with the appended claims. To better describe and explain contents of the present invention to one person skilled in the art, different parts in the diagrams are not drawn according to relative sizes or ratios, and certain sizes and associated scales may be enlarged for better distinction. Further, irrelevant details may not be all depicted to maintain the simplicity of the diagrams for better understanding.

Figure 1A:
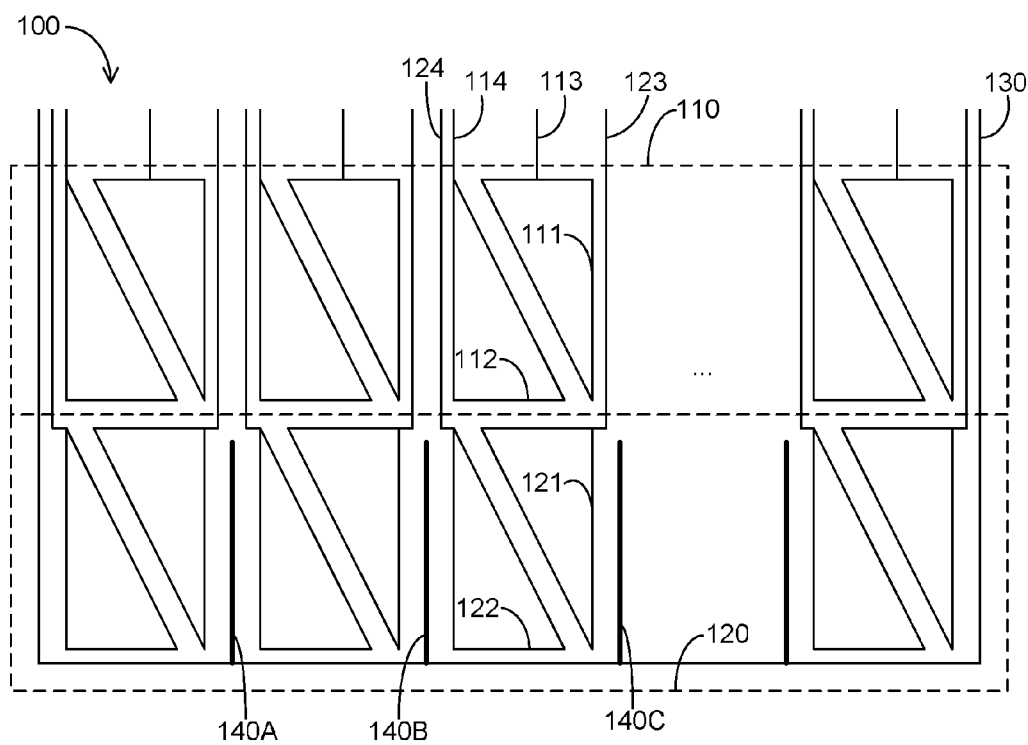
FIG. 1A is a schematic diagram of a sensing electrode structure according to an embodiment of the present invention.

FIG. 1A shows a schematic diagram of a sensing electrode structure 100 according to an embodiment of the present invention. The sensing electrode structure 100 may be formed on a substrate of a touch device. The touch device may be a part of a touch pad or a part of a touch screen. The substrate may be transparent or non-transparent. In some embodiments, the touch device may be an in-cell touch screen. In other embodiments, the touch device may be an on-cell touch screen.

The sensing electrode structure 100 includes a first sensing electrode row 110, a second sensing electrode row 120 parallel to the first sensing electrode row 110, and a guard ring 130 surrounding the second sensing electrode row 120. In the embodiment in FIG. 1A, the guard ring 130 surrounds a part of the first sensing electrode row 110.

The first sensing electrode row 110 includes a plurality of first sensing electrode units arranged in one row. Each of the first sensing electrode units includes a first electrode 111, a second electrode 112, a first conducting wire 113 connected to the first electrode 111, and a second conductive wire 114 connected to the second electrode 112. The first electrode 111 faces the second electrode 112. In some embodiments, the first electrode 111 includes an electrode having a pseudo-triangular planar contour. The so-called pseudo-triangle refers to a triangle, a trapezoid or a polygon. One person skilled in the art can understand that, given the first electrode 111 faces the second electrode 112, the planar contours of the first electrode 111 and the second electrode 112 are not limited.

Similarly, the second sensing electrode row 120 parallel to the first sensing electrode row 110 includes a plurality of second sensing electrode units arranged in one row. Each of the second sensing electrode units includes a third electrode 121, a fourth electrode 122, a third conducting wire 123 connected to the third electrode 121, and a fourth conducting wire 124 connected to the fourth electrode 122. The third electrode 121 faces the fourth electrode 122. In some embodiments, the third electrode 121 includes an electrode having a pseudo-triangular planar contour. The so-called pseudo-triangle refers to a triangle, a trapezoid or a polygon. One person skilled in the art can understand that, given the third electrode 121 faces the fourth electrode 122, the planar contours of the third electrode 121 and the fourth electrode 122 are not limited.

The first sensing electrode unit corresponds to one second sensing electrode unit. The third conducting wire 123 and the fourth conducting wire 124 of the second sensing electrode 124 extend upwards to the top along a side of the corresponding first sensing electrode unit. In other words, in the first sensing electrode row 110 located at the top, the first electrode 111 and/or the second electrode 112 of the first sensing electrode unit is adjacent to the third conducting wire 123 and/or the fourth conducting wire 124. However, as the third conducting wire 123 and the fourth conducting wire 124 extend upwards, the third electrode 121 and/or the fourth electrode 122 of the second sensing electrode row 120 located at the bottom are not adjacent to other conducting wires. Such arrangement yields an additional mutual capacitance effect. When an external conductive object approaches or come into contact with a region of the first sensing electrode 110 located at the top, mutual capacitance value(s) between the first electrode 111 and/or the second electrode 112 and the third conducting wire 123 and/or the fourth conducting wire 124 is/are changed. In other words, from perspectives of a controller of the touch device, the mutual capacitance amounts of the third electrode 121 and the fourth electrode 122 connected to the third conducting wire 123 and the fourth conducting wire 124 are changed. In summary, when an external conductive object approaches or comes into contact with the first sensing electrode row 110 and the second electrode row 120, the capacitance effect caused is changed to generate a non-linear result.

Therefore, in the present invention, a plurality of guard electrodes 140, i.e., a plurality of guard electrodes 140A, 140B and 140C connected to the guard ring 130 in FIG. 1A, are placed between the second sensing electrode units of the second sensing electrode row 120. When an external object approaches or comes into contact with the region of the second sensing electrode row 120, the third electrode 121 and/or the fourth electrode 122 adjacent to the guard electrode 140 are/is affected to result in a mutual capacitance effect similar to that of the first sensing electrode row 110 located at the top. Such effect allows the controller of the touch device to better eliminate the routing mismatch between the first sensing electrode row 110 and the second sensing electrode row 120 and to reduce non-linear calculation results.

Figure 1B:
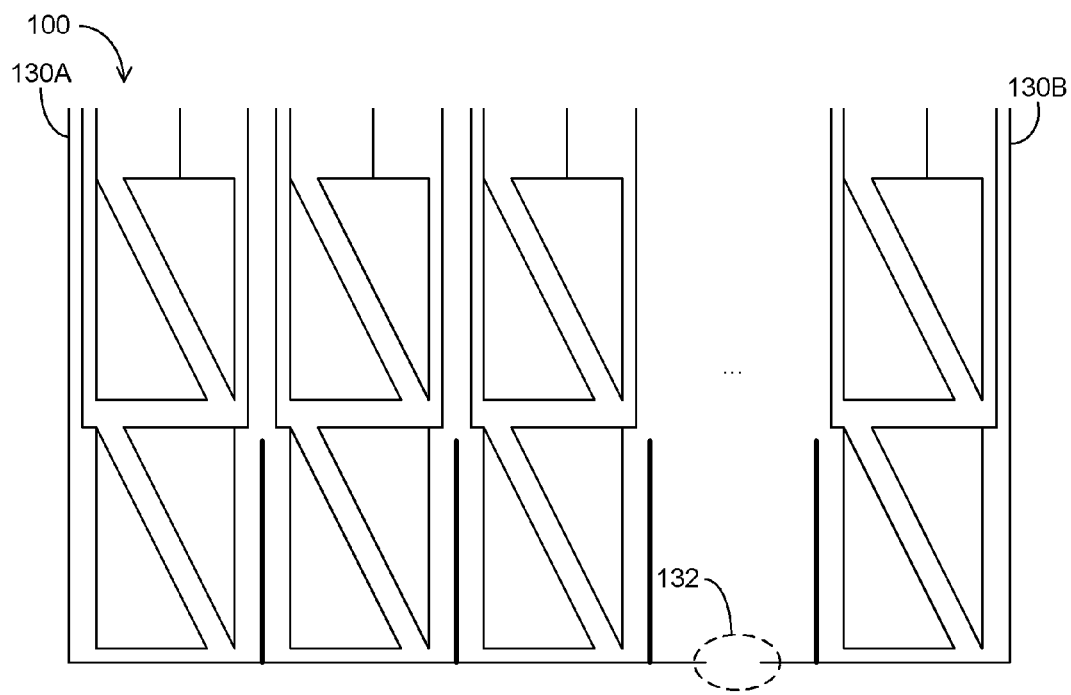
FIG. 1B is a schematic diagram of a sensing electrode structure according to another embodiment of the present invention.

FIG. 1B shows a schematic diagram of a sensing electrode structure 100 according to another embodiment of the present invention. Compared to FIG. 1A, a difference between the embodiment in FIG. 1B and that in FIG. 1A is that, the guard ring 130 in FIG. 1B includes a breach 132 in the middle of the guard ring 130, thus dividing the guard ring 130 into a first guard ring portion 130A and a second guard ring portion 130B. Each of the guard electrodes 140 is connected to the first guard ring portion 130A or the second guard ring portion 130B. A position of the breach 132 is not limited by the present invention. In some embodiments, all of the guard electrodes 140 are connected to the first guard ring portion 130A. In other embodiments, all of the guard electrodes 140 are connected to the second guard ring portion 130B. In yet another embodiment, a part of the guard electrodes 140 are connected to the first guard ring portion 130A and the remaining part of the guard electrodes 140 are connected to the second guard ring portion 130B.

Figure 2:
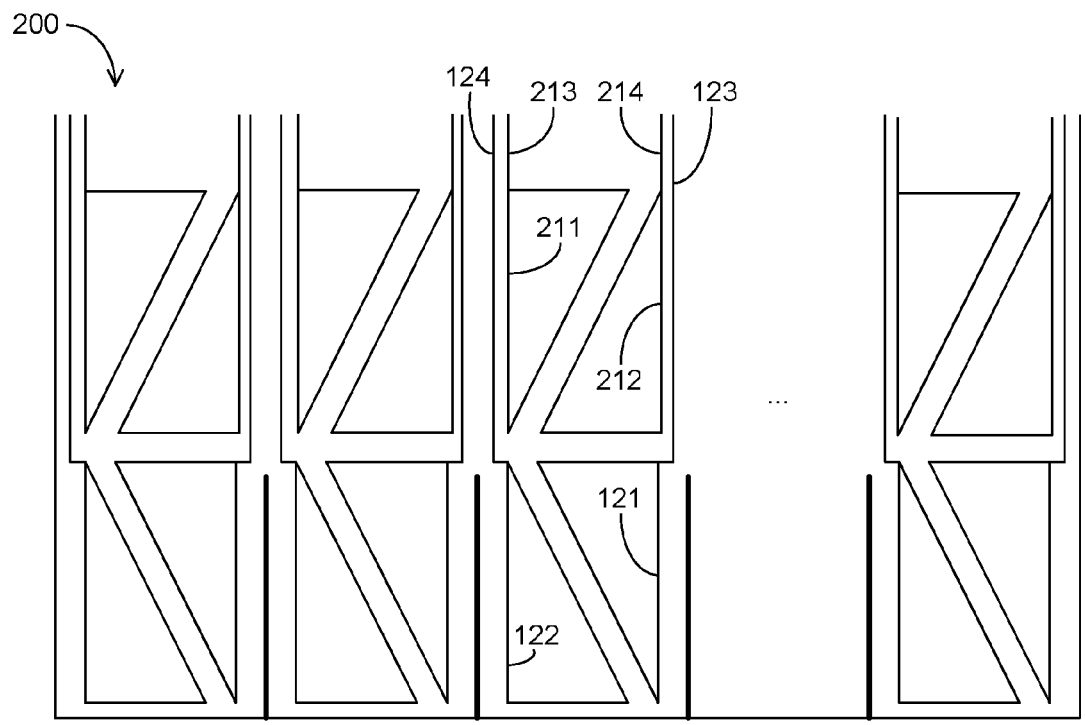
FIG. 2 is a schematic diagram of a sensing electrode structure according to another embodiment of the present invention.

FIG. 2 shows a schematic diagram of a sensing electrode structure 200 according to another embodiment of the present invention. Compared to FIG. 1A, a difference of the embodiment in FIG. 2 is that, a planar contour of the electrodes of the first sensing electrode unit and a planar contour of the electrodes of the second sensing electrode unit in FIG. 2 are mirrored along an axis. The mirroring axis is about a separation line of the first sensing electrode row 110 and the second sensing electrode row 120.

In the embodiment in FIG. 2, a planar contour of a first electrode 211 mirrors that of a fourth electrode 122, and a planar contour of a second electrode 212 mirrors that of a third electrode 121. In another embodiment, the planar contour of the first electrode 211 may mirror that of the third electrode 121, and the planar contour of the second electrode 212 may mirror that of the third electrode 122. That is to say, in the present invention, given the planar contour the electrodes of the first sensing electrode unit mirrors the planar contour of the electrodes of the second sensing electrode unit, one electrode is not restricted to mirror a specific electrode. For example, the planar contour of the first electrode 211 may mirror that of the third electrode 121 or the fourth electrode 122, and the planar contour of the second electrode 212 may mirror that of the fourth electrode 122 or the third electrode 121. From another perspective, the planar contour of the electrodes of the first sensing electrode unit is exactly the planar contour of the electrodes of the second sensing electrode unit flipped along the middle axis. Vice versa, the planar contour of the electrodes of the second sensing electrode unit is exactly the planar contour of the electrodes of the first sensing electrode unit flipped along the middle axis.

Figure 3:
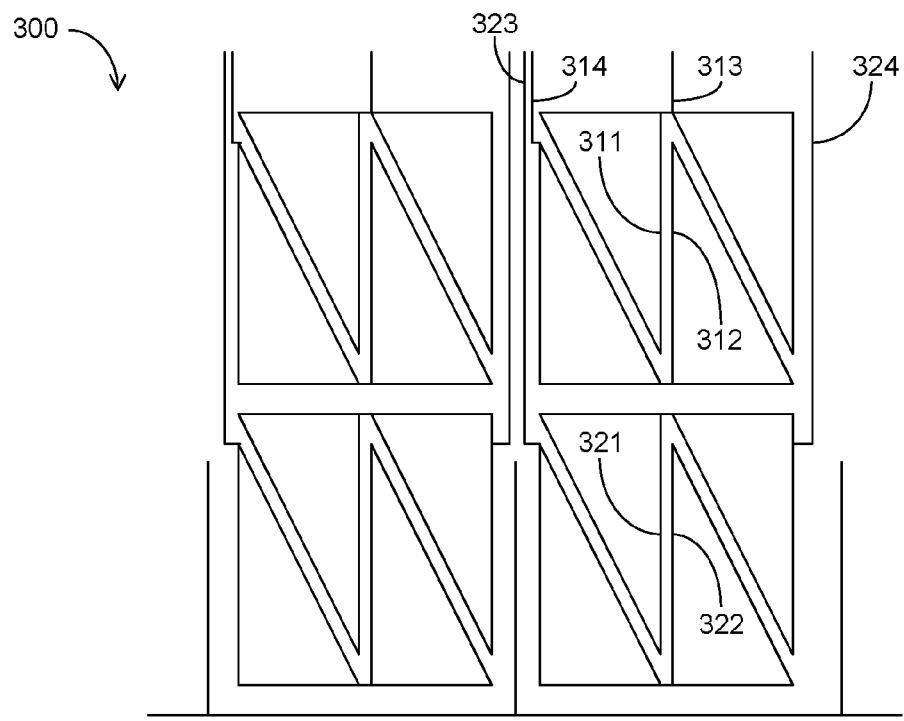
FIG. 3 is a schematic diagram of a sensing electrode structure according to another embodiment of the present invention.

FIG. 3 shows a schematic diagram of a sensing electrode structure 300 according to another embodiment of the present invention. Compared to FIG. 1A, a difference of the embodiment in FIG. 3 is that, each of a first electrode 311, a second electrode 312, a third electrode 313 and a fourth electrode 314 in FIG. 3 includes two pseudo-triangles. In another embodiment, each of the electrodes of the first sensing electrode unit and the second sensing electrode unit may include multiple pseudo-triangular electrodes. It should be noted that, the plurality of guard electrodes 140 are still respectively located between two second sensing electrode units.

Figure 4:
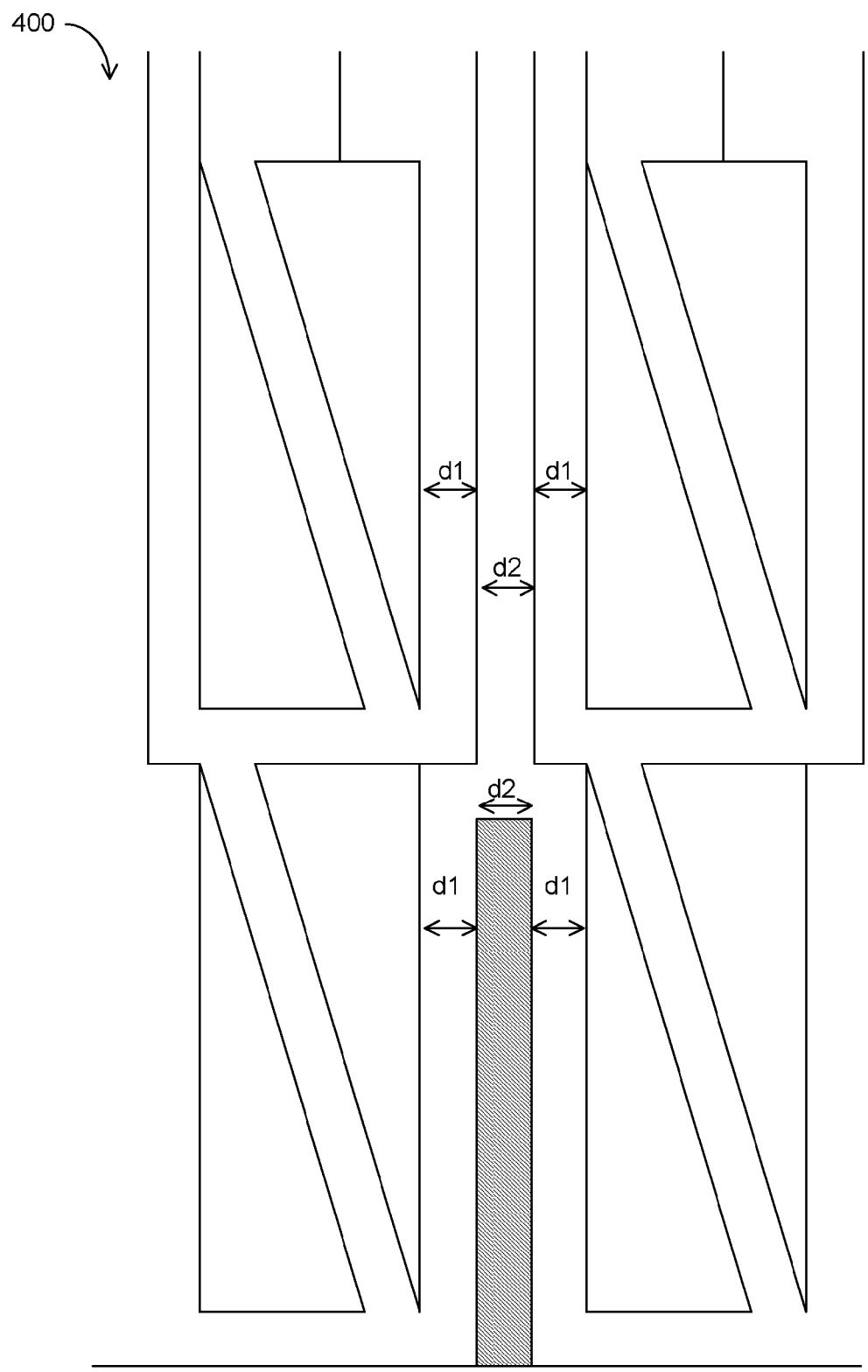
FIG. 4 is a schematic diagram of a sensing electrode structure according to another embodiment of the present invention.

FIG. 4 shows a schematic diagram of a sensing electrode structure 400 according to another embodiment of the present invention. The embodiment in FIG. 4 is identical to that in FIG. 1A, except that FIG. 4 is for illustrating a relationship of sizes. In the embodiment, a distance between the first electrode 121 and the third electrode 123 is d1, and a distance between the second conducting wire 122 and the fourth conducting wire 124 is also d1. Assume that a distance between the adjacent third conducting wire 123 and fourth conducting wire 124 is d2.

In the embodiment shown in FIG. 4, respective distances from an edge of the guard ring 140 to the third electrode 121 and the fourth electrode 122 are both d1. Thus, associated mutual capacitance effects are substantially equal, and largest differences between the first sensing electrode row 110 and the second sensing electrode row 120 are eliminated.

In the embodiment in FIG. 4, when the distance between the adjacent third conducting line 123 and fourth conducting line 124 is d2, a width of the corresponding guard electrode 140 may also be set to d2 to facilitate routing and layout designs. In some embodiments, the distance d1 may be designed to equal to d2. In other words, the distance between the third conducting wire 123 and the first electrode 111, the distance between the third electrode 121 and the nearest guard electrode 140, and the width of the guard electrode 140 are equal.

Figure 5:
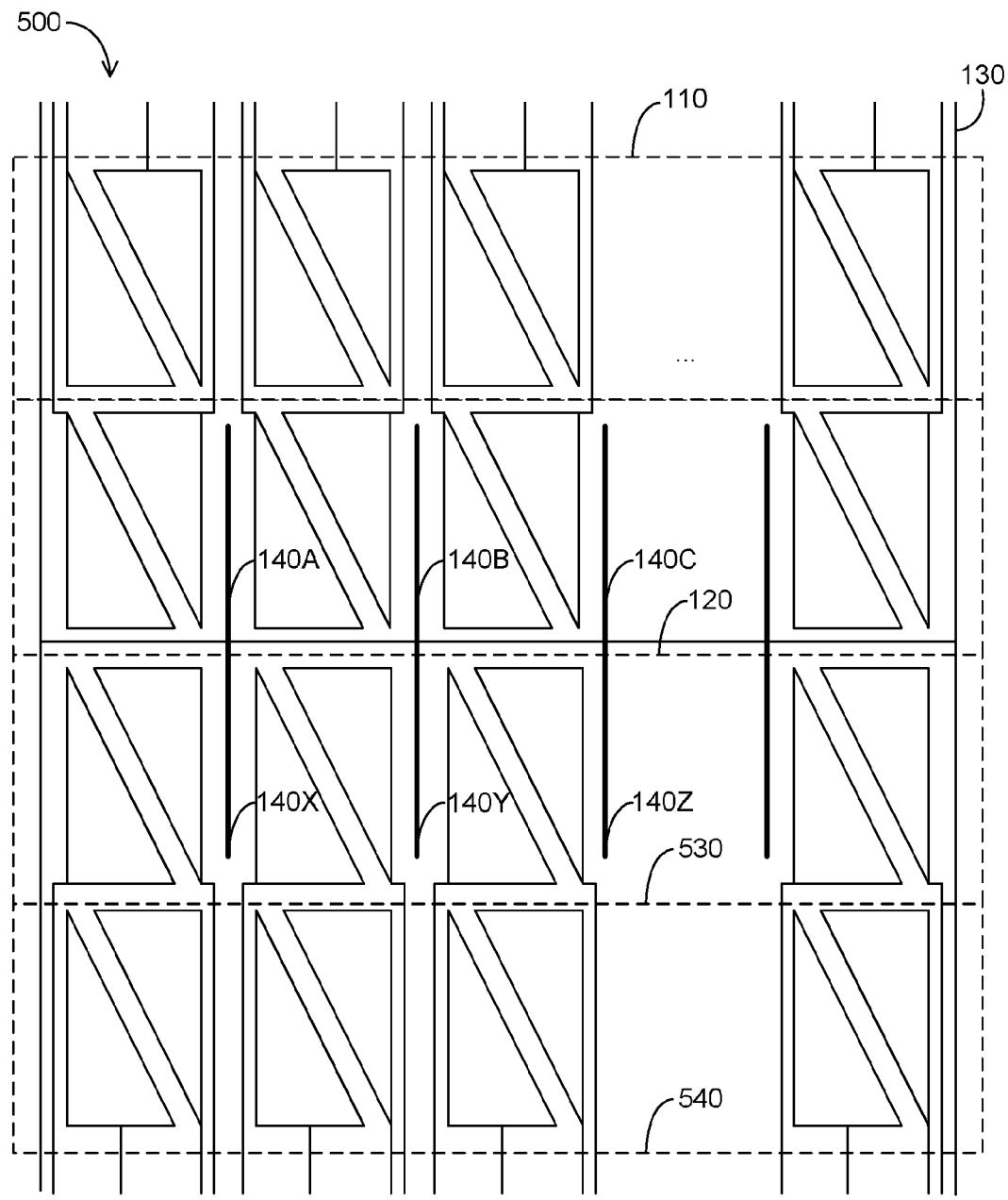
FIG. 5 is a schematic diagram of a sensing electrode structure according to another embodiment of the present invention.

FIG. 5 shows a schematic diagram of a sensing electrode structure 500 according to another embodiment of the present invention. The upper part of the sensing electrode structure 500, identical to that of the sensing electrode structure 100 in FIG. 1A, includes a first electrode row 110 and a second electrode row 120. The sensing electrode structure 500 further includes a third electrode row 530 and a fourth electrode row 540. The third electrode row 530 includes a plurality of third sensing electrode units, and the fourth sensing electrode row 540 includes a plurality of fourth sensing electrode units. Each of the third sensing electrode units corresponds to one of the fourth sensing electrode units.

In one embodiment, the structure of the third electrode row 530 may correspond to that of the second electrode row 120, and the structure of the fourth electrode row 540 may correspond to that of the first electrode row 110. Conducting wires of the electrodes of the third electrode row 530 penetrate through the fourth electrode row 540 to exit from the bottom. That is, the conducting wires of the third sensing electrode units are extended to the bottom along a side of the corresponding fourth sensing electrode unit. As previously stated, the correspondence of the electrodes of the first electrode row 110 and the second electrode row 120 is not limited, and the correspondence of the electrodes of the third electrode row 530 and the fourth electrode row 540 is not limited either.

In the embodiment in FIG. 5, the guard ring 130 is disposed between the second electrode row 120 and the third electrode row 130, and surrounds the third electrode row 130. The guard ring 130 further surrounds a part of the fourth sensing electrode row 540. Similar to the guard electrodes 140A, 140B and 140C that extends to each two of the second sensing electrode units of the second electrode row 120, a plurality of guard electrodes 140X, 140Y and 140Z also extends to each two of the third sensing electrode units of the third electrode row 530. These additional guard electrodes 140X, 140Y and 140Z similarly connect to the guard ring 130.

Figure 6:
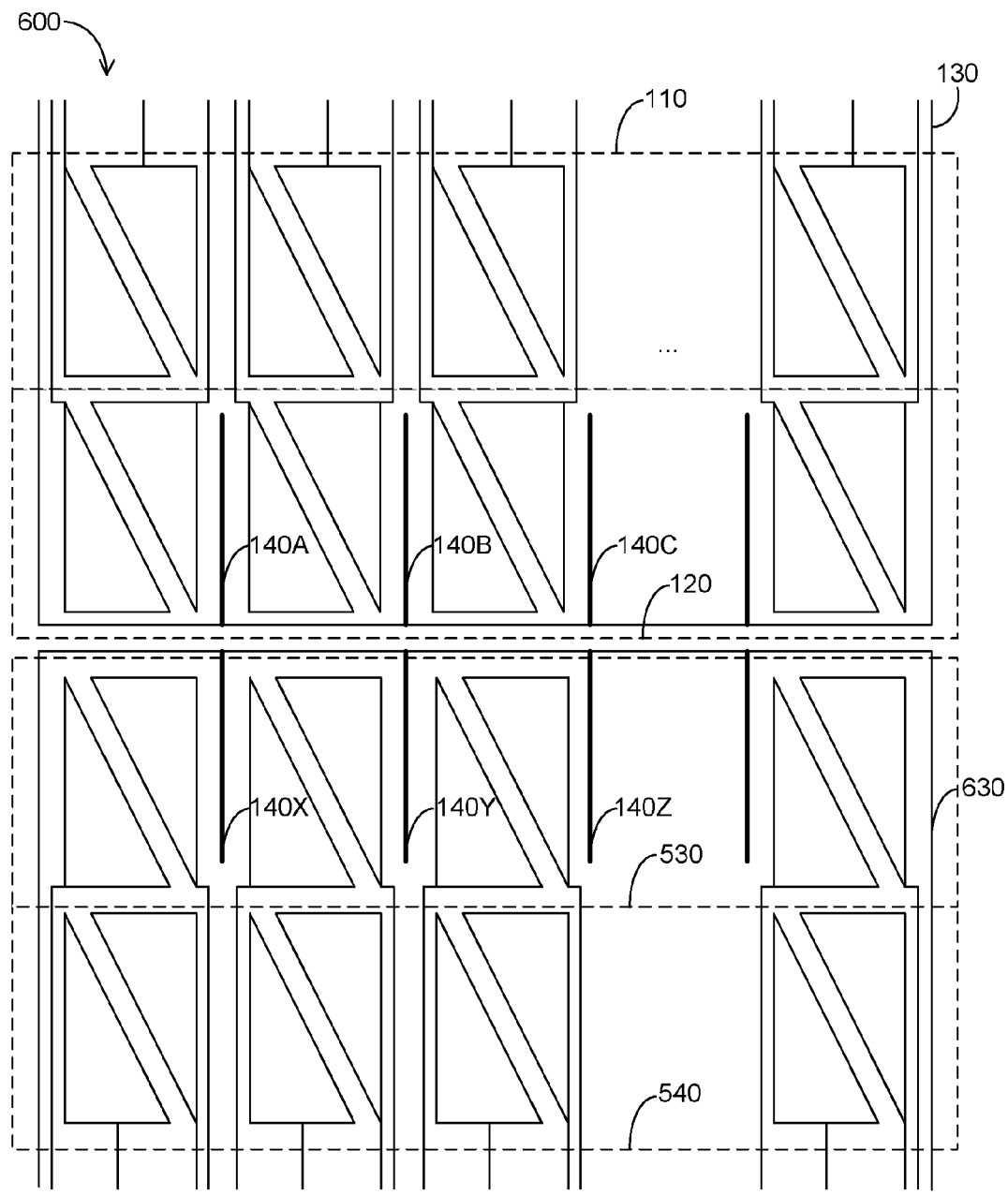
FIG. 6 is a schematic diagram of a sensing electrode structure according to another embodiment of the present invention.

FIG. 6 shows a schematic diagram of a sensing electrode structure 600 according to another embodiment of the present invention. The upper part of the sensing electrode structure 600 is identical to that of the sensing electrode structure 100 in FIG. 1A; the lower part of the sensing electrode structure 600 is also identical to that of the sensing electrode structure 100 in FIG. 1A, however in an opposite direction. Compared to the sensing electrode sensing structure 500 in FIG. 5, the electrode sensing structure 600 in FIG. 6 further includes a second guard ring portion 630 that surrounds the third sensing electrode row. As the guard ring 130 and the second guard ring portion 630 are completely separated, the guard rings 140X, 140Y and 140Z are connected to the second guard ring portion 630 instead.

One person skilled in the art can easily understand that, various details and features associated with FIG. 1A to FIG. 4 are applicable to the embodiments in FIG. 5 and FIG. 6, and shall be omitted herein.

In conclusion, a main spirit of the present invention is extending a circuit of the guard ring to between the second sensing electrode units of the second sensing electrode row, so that the mutual capacitance effect of the second sensing electrode row is substantially equal to that of the first sensing electrode row inserted into conducting wires to reduce the level of non-linearity, thereby enhancing the touch sensing accuracy.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A sensing electrode structure, formed on a substrate of a touch device, comprising:
    a first sensing electrode row;
    a second sensing electrode row, parallel to the first sensing electrode row, comprising a plurality of second sensing electrode units; and
    a guard ring, surrounding the second sensing electrode row, comprising a plurality of guard electrodes arranged between each two of the second sensing electrode units,
    wherein the first sensing electrode row comprises a plurality of first sensing electrode units, and each of the first sensing electrode units corresponds to one of the second sensing electrode units.

2. The sensing electrode structure according to claim 1, wherein the guard ring comprises a first guard ring portion and a second guard ring portion that are disconnected, and each of the guard electrodes is connected to one of the first guard ring portion and the second guard ring portion.

3. The sensing electrode structure according to claim 1, wherein a planar contour of an electrode of the first sensing electrode unit is identical to a planar contour of an electrode of the second sensing electrode unit.

4. The sensing electrode structure according to claim 1, wherein a planar contour of an electrode of the first sensing electrode unit mirrors a planar contour of an electrode of the corresponding second sensing electrode unit.

5. The sensing electrode structure according to claim 1, wherein the first sensing electrode unit comprises a first electrode and a second electrode corresponding to the first electrode, the first electrode comprises more than one pseudo-triangular electrode, and the second electrode comprises a pseudo-triangular electrode facing the pseudo-triangular electrode of the first electrode; the second sensing electrode unit comprises a third electrode and a fourth electrode corresponding to the third electrode, the third electrode comprises more than one pseudo-triangular electrode, and the fourth electrode comprises a pseudo-triangular electrode facing the pseudo-triangular electrode of the third electrode.

6. The sensing electrode structure according to claim 5, wherein the second sensing electrode unit further comprises a third conducting wire connected to the third electrode; a distance between the third conducting wire and the first electrode is substantially equal to a distance between the third electrode and the nearest guard electrode.

7. The sensing electrode structure according to claim 5, wherein the second sensing electrode unit further comprises a third conducting wire connected to the third electrode, and the adjacent second sensing electrode further comprises a fourth conducting line connected to the fourth electrode unit of the second sensing electrode unit; a distance between the third conducting wire and the fourth conducting wire is substantially equal to a width of the nearest guard electrode.

8. The sensing electrode structure according to claim 5, wherein the second sensing electrode unit further comprises a third conducting wire connected to the third electrode, and the adjacent second sensing electrode further comprises a fourth conducting line connected to the fourth electrode unit of the second sensing electrode unit; a distance between the third conducting wire and the first electrode, a distance between the third electrode and the nearest guard electrode, and a width of the guard electrode nearest to the third electrode are substantially equal.

9. The sensing electrode structure according to claim 1, wherein widths of the guard electrodes are different from a width of the guard ring.

10. The sensing electrode structure according to claim 1, further comprising:
  a third sensing electrode row, parallel to the first sensing electrode row, comprising a plurality of third sensing electrode units; and
  a fourth sensing electrode row, parallel to the first sensing electrode row;
  wherein, the guard ring surrounds the third sensing electrode row, and comprises a plurality of guard electrodes arranged between each two of the third sensing electrode units.

11. The sensing electrode structure according to claim 1, further comprising:
  a third sensing electrode row, parallel to the first sensing electrode row, comprising a plurality of third sensing electrode units;
  a fourth sensing electrode row, parallel to the first sensing electrode row; and
  a second guard ring portion, surrounding the third sensing electrode row, comprising a plurality of guard rings arranged between the third sensing electrode units.

* * * * *